United States Patent [19]

Creamer et al.

[11] Patent Number: 5,430,114

[45] Date of Patent: Jul. 4, 1995

[54] WATER-SOLUBLE ADDITION POLYMERS OF CYCLOHEXENE ANHYDRIDES

[75] Inventors: Marianne P. Creamer, North Wales; Thomas F. McCallum, III, Philadelphia; Graham Swift, Blue Bell; Barry Weinstein, Dresher, all of Pa.

[73] Assignee: Rohm and Haas Company, Philadelphia, Pa.

[21] Appl. No.: 346,431

[22] Filed: Nov. 29, 1994

Related U.S. Application Data

[62] Division of Ser. No. 3,375, Jan. 12, 1993, Pat. No. 5,395,905.

[51] Int. Cl.$^6$ .................. C08F 2/10; C08F 230/04; C08F 222/04; C08F 226/02; C08F 220/06; C08F 220/10

[52] U.S. Cl. .................. 526/89; 526/271; 526/240; 526/307.6; 526/317.1; 526/328.5

[58] Field of Search .............. 526/89, 240, 271, 307.6, 526/317.1, 328.5

[56] References Cited

U.S. PATENT DOCUMENTS

| | | |
|---|---|---|
| 2,359,038 | 2/1944 | Hopff et al. |
| 2,421,876 | 6/1947 | Gerhart. |
| 2,479,486 | 8/1949 | Gerhart. |
| 2,537,845 | 1/1951 | Morris et al. |
| 2,560,119 | 7/1951 | McCaslin et al. |
| 3,839,113 | 9/1974 | Smallman. |
| 4,126,738 | 11/1978 | Gaylord ............ 526/271 |
| 4,202,955 | 5/1980 | Gaylord. |
| 5,258,227 | 11/1993 | Gaa et al. ............ 428/392 |

OTHER PUBLICATIONS

U.S.S.R. Inventor's Certificate SU 891,707, Published Dec. 23, 1981.

*Primary Examiner*—Joseph L. Schofer
*Assistant Examiner*—Wu C. Cheng
*Attorney, Agent, or Firm*—James G. Vouros; David T. Banchik

[57] ABSTRACT

The present invention provide water-soluble poylmers containing, as polymerized units: (a) from about 3 to about 95 percent by weight of one or more cyclohexene anhydrides or the alkali metal or ammonium salts thereof. The present further provides aqueous polymerization processes for making the polymers. The water-soluble polymers are useful as water-treatment additives for boiler waters and cooling towers and as detergent additives acting as builders, anti-filming agents, dispersants, sequestering agents and encrustation inhibitors.

9 Claims, No Drawings

WATER-SOLUBLE ADDITION POLYMERS OF CYCLOHEXENE ANHYDRIDES

This is a divisional of application Ser. No. 08/003,375, filed Jan. 12, 1993 now as U.S. Pat. No. 5,395,905.

This invention relates to water-soluble addition polymers of cyclohexene anhydrides. In particular, this invention relates to water-soluble addition polymers of cyclohexene anhydrides with one or more monoethylenically unsaturated monomers.

Cyclohexene anhydrides are monoethylenically unsaturated six-membered rings with anhydride functionality attached to the ring. For example, 1,2,3,6-cis-tetrahydrophthalic anhydride is a cyclohexene anhydride with the following structure:

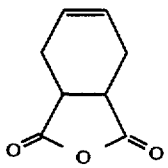

Cyclohexene anhydrides are commonly prepared by Diels-Alder processes. For example, 1,2,3.6-cis-tetrahydrophthalic anhydride can be prepared by a Diels-Alder reaction between butadiene and maleic anhydride. 5-Norbornene-2,3-dicarboxylic acid anhydride can be prepared from maleic anhydride and cyclopentadiene. Other cyclohexene anhydrides can be made by using substituted analogs of either the diene or anhydride.

Cyclohexene anhydrides can lie used as a monomer in either of two ways:

1) to produce condensation polymers by reacting the carboxyl groups of the cyclohexene anhydrides with reactive moieties such as hydroxyls to form polyesters, or
2) to produce addition polymers by free-radical polymerization at the site of ethylenic unsaturation.

Water-soluble addition polymers and copolymers are useful as water-treatment additives for boiler waters and cooling towers and as detergent and cleaner additives acting as builders, anti-filming agents, dispersants, sequestering agents and encrustation inhibitors.

Addition copolymers have been prepared by reacting equimolar amounts of maleic anhydride and tetrahydrophthalic anhydride by processes using molten reactants as the reaction medium, or by processes employing organic solvents such as methyl ethyl ketone, toluene and diethyl benzene.

Addition copolymers of maleic anhydride and endo-cis-5-norbornene-2,3-dicarboxylic anhydride have been prepared by processes employing no solvent, or employing inert organic solvents.

The present invention provides new water-soluble addition polymers of cyclohexene anhydrides.

The present invention seeks to further provide an aqueous process for preparing water-soluble addition polymers of cyclohexene anhydrides.

According to a first aspect of the present invention there is provided a water-soluble polymer containing, as polymerized units:

(a) from about 3 to about 95 percent by weight of one or more cyclohexene anhydrides or the alkali metal or ammonium salts thereof;
(b) from about 5 to about 97 percent by weight of one or more monomers selected from the group consisting of
(i) compounds having the formula

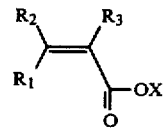

where $R_1$ and $R_2$, are each independently selected from the group consisting of hydrogen, methyl, and ethyl;
$R_3$ is selected from the group consisting of hydrogen, methyl, ethyl, propyl, isopropyl, butyl, isobutyl and tert-butyl; and
X is selected from the group consisting of hydrogen, methyl, ethyl, propyl, hydroxyethyl, hydroxy propyl, alkali metals, and ammonium, and
ii) acrylamides. and substituted acrylamides; and optionally
(c) from 0 to about 90 percent by weight of one or more monoethylenically unsaturated monomers wherein said monoethylenically unsaturated monomers are at least partially water-soluble and polymerizable with (a) and (b).

According to a second aspect of the present invention there is provided an aqueous process for preparing water-soluble polymers comprising: polymerizing a monomer mixture in the presence of water and one or more polymerization initiators at an elevated temperature, wherein the monomer mixture comprises (a) from about 3 to about 95 percent by weight of one or more cyclohexene anhydrides or the alkali metal or ammonium salts thereof;
(b) from about 5 to about 97 percent by weight of one or more monomers selected from the group consisting of
(i) compounds having the formula

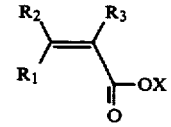

where $R_1$ and $R_2$, are each independently selected from the group consisting of hydrogen, methyl, and ethyl;
$R_3$ is selected from the group consisting of hydrogen, methyl, ethyl, propyl, isopropyl, butyl, isobutyl and tert-butyl; and
X is selected from the group consisting of hydrogen, methyl, ethyl, propyl, hydroxyethyl hydroxypropyl, alkali metals, and ammonium, and
ii) acrylamides, and substituted acrylamides; and optionally
(c) from 0 to about 90 percent by weight of one or more monoethylenically unsaturated monomers wherein said monoethylenically unsaturated monomers are at least partially water-soluble and polymerizable with (a) and (b).

The water-soluble polymers of the present invention are useful as water-treatment additives for boiler waters and cooling towers, as additives to cleaning formulations, as mineral dispersants, and as additives to automatic machine-dishwashing detergents and to laundry detergents acting as builders, anti-filming agents, dispersants, sequestering agents and encrustation inhibitors.

The polymers of the present invention contain, as polymerized units from about 3 to about 95 percent by weight of one or more cyclohexene anhydrides or the alkali metal or ammonium salts thereof. Cyclohexene anhydrides are monoethylenically unsaturated six-membered rings with anhydride functionality attached to the ring. The simplest cyclohexene anhydride is 1,2,3,6-tetrahydrophthalic anhydride which has the following structure:

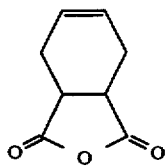

Other suitable cyclohexene anhydrides have alkyl substituents of from one to four carbon atoms attached to any of the carbons of the cyclohexene ring. Still other suitable cyclohexene anhydrides are those wherein the cyclohexene ring is part of a bicyclic structure. In a bicyclic cyclohexene anhydride structure, the other ring may be formed by the presence of an oxygen atom, a methylene group or an ethylene group which is attached to two distinct carbon atoms of the cyclohexene ring. Examples of cyclohexene anhydrides include 1,2,3,6-tetrahydrophthalic anhydride, 3,6-epoxy-1,2,3,6-tetrahydrophthalic anhydride; 5-norbornene-2,3-dicarboxylic anhydride, bicyclo[2.2.2]-5-octene-2,3-dicarboxylic anhydride, 3-methyl-1,2,6-tetrahydrophthalic anhydride, and 2-methyl- 1,3,6-tetrahydrophthalic anhydride. Preferably, the cyclohexene anhydride is 1,2.3,6-cis-tetrahydrophthalic anhydride (THPA), which, when hydrolysed is referred to as cyclohexene dicarboxylic acid (CDC). CDC and the alkali metal salts of CDC are the most preferred cyclohexene anhydride, although combinations of cyclohexene anhydrides can be used.

The preferred level of cyclohexene anhydride in the polymers of the present invention varies, and is dependent on the balance of properties needed in the particular application. Higher amounts of cyclohexene anhydride may be desirable, for example, to enhance the salt tolerance of the resulting polymer. Thus, polymers containing high levels of cyclohexene anhydride are compatible in brine solutions, basic solutions and calcium containing solutions. Lower levels of cyclohexene anhydride may be desirable, for example, to enhance the ability of the polymer to sequester calcium, thereby improving the detergency properties of the polymer. Preferably, the polymers of the present invention contain, as polymerized units, one or more cyclohexene anhydrides or alkali metal or ammonium salts thereof at a level of from about 5 to about 90, and most preferably from about 10 to about 85 percent by weight of the polymer.

The polymers of the present invention also contain one or more monoethylenically unsaturated monomers selected from the group of i) compounds having the formula

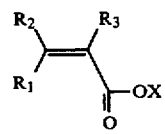

where

R$_1$ and R$_2$, are each independently selected from the group consisting of hydrogen, methyl, and ethyl;

R$_3$ is selected from the group consisting of hydrogen, methyl, ethyl, propyl, isopropyl, butyl, isobutyl and tert-butyl; and X is selected from the group consisting of hydrogen, methyl, ii) acrylamides, and substituted acrylamides.

Preferred compounds of formula (i) which can be used as the one or more monoethylenically unsaturated monomers are monoethylenically unsaturated monocarboxylic acids containing from three to six carbon atoms, and the alkali metal and ammonium salts thereof. Preferred examples of compounds of formula (i) include, but are not limited to, acrylic acid, methacrylic acid, crotonic acid, vinylacetic acid and the alkali metal and ammonium salts thereof. Most preferably, the one or more monoethylenically unsaturated monomers are acrylic acid, methacrylic acid or the alkali metal salts thereof.

Other preferred compounds of formula (i) which can be used as the one or more monoethylenically unsaturated monomers are monoethylenically unsaturated carboxyl-free monomers including C$_1$–C$_4$alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate.

Preferred compounds of group (ii) which can be used as the one or more monoethylenically unsaturated monomers are acrylamides and alkyl-substituted acrylamides including acrylamide, methacrylamide, N-tertiarybutylacrylamide, N-methylacrylamide, N,N-dimethylacrylamide and 2-acrylamido-2-methylpropanesulfonic acid and the alkali metal and ammonium salts thereof.

The polymers of the present invention contain, as polymerized units, the one or more monoethylenically unsaturated monomers at levels of from about 5 to about 97 percent by weight, preferably from about 15 to about 95 percent by weight, and most preferably from about 25 to about 90 percent by weight.

Optionally, the polymers of the present invention may contain one or more other monoethylenically unsaturated monomers which are at least partially water-soluble and polymerizable with (a) and (b). The preferred optional monoethylenically unsaturated monomers include C$_4$–C$_6$ monoethylenically unsaturated dicarboxylic acids and the alkali metal and ammonium salts thereof, and the anhydrides of the cis-dicarboxylic acids including maleic acid, maleic anhydride, itaconic acid, mesaconic acid, fumaric acid and citraconic acid. Preferred examples of the optional monoethylenically unsaturated monomers include acrylonitrile, methacrylonitrile, allyl alcohol, allylsulfonic acid, allylphosphonic acid, isopropenylphosphonic acid, vinylphosphonic acid, phosphoethyl methacrylate, N-vinylpyrrolidone, N-vinylformamide, N-vinylimidazole, vinyl acetate, styrene, styrenesulfonic acid and salts thereof, and vinylsulfonic acid and salts thereof. Most preferably, the optional monoethylenically unsaturated monomer is maleic anhydride, maleic acid or itaconic acid or salts thereof. The polymers of the present invention contain, as polymerized units, these optional monoethylenically unsaturated monomers at levels of from 0 to about 90 percent by weight, preferably from 0 to 70 percent and most preferably from 0 to 65 percent by weight.

The polymerization can be conducted as a cofeed, heel, semi-continuous or continuous process. Preferably, when the polymerization is conducted as a cofeed process most, or all, of the one or more cyclohexene dicarboxylic acids are present in the reactor and the one or more monoethylenically unsaturated monomers are fed into the reactor over time. Generally, the feeds are conducted for from 5 minutes to 5 hours, preferably from 30 minutes to 4 hours, and most preferably from 1 hour to 3 hours.

When the process of the present invention is run as a heel process, initiator and the one or more monoethylenically unsaturated monomers and the one or more optional monoethylenically unsaturated monomers, if used, are introduced into the reaction mixture as separate streams which are fed linearly (i.e. at constant rates). Other optional components of the reaction mixture, such as neutralizer solutions, chain regulators, and metals, may also be fed into the reaction mixture as separate streams or combined with one or more of the other feed streams. Preferably, the optional components are present in the heel, If desired, the streams can be staggered so that one or more of the streams are completed before the others. If desired, a portion of the one or more monoethylenically unsaturated monomers and the one or more optional monoethylenically unsaturated monomers, if used, and/or a portion of the initiators may be added to the reactor before the feeds are begun. The monomers can be fed into the reaction mixture as individual streams or combined into one or more streams. Preferably, the monomer stream containing the one or more monoethylenically unsaturated monomers and the one or more optional monoethylenically unsaturated monomers, if used, is not combined with the monomer stream containing the cyclohexene anhydride.

The processes by which the polymers of the present invention are prepared are aqueous processes, substantially free of organic solvents. The water may be introduced into the reaction mixture initially, as a separate feed, as the solvent for one or more of the other components of the reaction mixture or some combination thereof. Generally, the polymerizations have a final solids levels in the range of from about 20 percent to about 80 percent by weight of the reaction mixture, preferably in the range of from about 30 to about 70 percent by weight, and most preferably from about 40 to about 70 percent by weight of the reaction mixture. When polymers are prepared with maleic anhydride or maleic acid as the one or more optional monoethylenically unsaturated monomers, it is preferred to conduct the polymerization at the higher solids level.

The temperature of the polymerization reaction will depend on the choice of initiator, and target molecular weight. Generally, the temperature of the polymerization is up to the boiling point of the system although the polymerization can be conducted under pressure if higher temperatures are used. Preferably, the temperature of the polymerization is from about 25 to about 110° C. and most preferably from about 40 to about 105° C.

Suitable initiators for the processes of the present invention are any conventional water-soluble initiators. One class of suitable initiators are free-radical initiators such as hydrogen peroxide, certain alkyl hydroperoxides, dialkyl peroxides, persulfates, peresters, percarbonates, ketone peroxides and azo initiators. Specific examples of suitable free-radical initiators include hydrogen peroxide, t-butyl hydroperoxide, di-tertiary butyl peroxide, ammonium persulfate, potassium persulfate, sodium persulfate, tertiary-amyl hydroperoxide and methylethyl ketone peroxide. The free-radical initiators are typically used in amounts of from about 1 percent to about 50 percent based on the total monomer weight. The amount of initiator used will vary according to the desired molecular weight of the resulting polymer and the relative amount of cyclohexene anhydride. As the relative amount of cyclohexene anhydride increases, or as the desired molecular weight of the polymer decreases, larger amounts of initiator are preferred.

Water-soluble redox initiators may also be used. These initiators include, but are not limited to, sodium bisulfite, sodium sulfite, persulfates, hypophosphites, isoascorbic acid, sodium formaldehyde-sulfoxylate and the like, used with suitable oxidizing agents, such as the thermal initiators noted above. The redox initiators are typically used in amounts of from about 0.05 percent to about 10 percent, based on the weight of total monomer. A preferred range is from [about 0.5 to about 5 percent by weight of total monomer. Combinations of initiators can also be used. A preferred method for making the polymers of the present invention uses both a free-radical initiator and a redox initiator. A particularly preferred combination of initiators is persulfate and peroxide.

In one embodiment of the present invention one or more water-soluble metal salts may be used to promote polymerization and to control the molecular weight of the resulting polymers. Water-soluble metal salts such as the salts of copper, iron, cobalt and manganese, are preferably used at levels of from about 1 to 200 parts per million (ppm) of the metal ion, based on the weight of polymerizable monomers, and more preferably from about 5 to 100 ppm. The preferred metal salts are the copper salts and iron salts, which include all inorganic and organic compounds that will generate copper or iron ions in aqueous solution. Suitable salts include sulfates, nitrates, chlorides, and acetates and glutonates.

It is generally desirable to control the pH of the polymerizing monomer mixture especially when using thermal initiators such as persulfate salts, whether alone or in combination with peroxides such as, for example, hydrogen peroxide. The pH of the polymerizing monomer mixture can be controlled by a buffer system or by the addition of a suitable acid or base and is preferably designed to maintain the pH of the system from between about 3 and about 8, and most preferably from between about 4 and about 6.5. The pH of the system can be adjusted to suit the choice of the redox couple by the addition of a suitable acid or base.

In processes wherein all or some of the monomers are gradually added to the reaction mixture, the pH of the reaction mixture can also be controlled by gradual addition of a neutralizer. Examples of suitable neutralizers include sodium, potassium or ammonium hydroxide or amines, such as, triethanolamine. These neutralizers are used as aqueous solutions and can be gradually added into the reaction mixture as a separate stream or as part of one of the other streams. Typical levels of neutralizers are from 20 to 95 equivalent % of base, more preferably from 20 to 80 equivalent % of base, based on the total acid functionality of the monomer components.

The process of the present invention generally results in good conversion of the monomers into polymer product. However, if residual monomer levels in the polymer mixture are undesirably high for a particular application, their levels can be reduced by any of several techniques.

One common method for reducing the level of residual monomer in a polymer mixture is post-polymerization addition of one or more initiators or reducing agents which can assist scavenging of unreacted monomer.

Preferably, any post-polymerization additions of initiators or reducing agents are conducted at or below the polymerization temperature. The initiators and reducing agents suitable for reducing the residual monomer content of polymer mixtures are well known to those skilled in the art. Generally, any of the initiators suitable for the polymerization are also suitable for reducing the residual monomer content of the polymer mixture.

The level of initiators or reducing agents added as a means for reducing the residual monomer content of the polymer mixture should be as low as possible to minimize contamination of the product. Generally, the level of initiator or reducing agent added to reduce the residual monomer content of the polymer mixture is in the range of from about 0.1 to about 5.0, and preferably from about 0.5 to about 3.0 mole percent based on the total amount of polymerizable monomer.

The polymers of the present invention are water-soluble. The water-solubility is affected by the molecular weight of the polymers and the relative amounts, and the hydrophilicity, of the monomer components incorporated into the polymer. If desired, chain regulators or chain transfer agents may be employed to assist in controlling the molecular weight of the polymers. Any conventional water-soluble chain regulator or chain transfer agent can be used. Suitable chain regulators include, but are not limited to, mercaptans, hypophosphites, alcohols and bisulfites. If used, mercaptans, such as 2-mercaptoethanol, or bisulfites, such as sodium metabisulfite, are preferred. Generally, the weight average molecular weights ($M_w$) of the polymers are from about 300 to about 500,000 preferably from about 1,000 to about 250,000 and most preferably from about 1,000 to about 100,000.

POLYMER SYNTHESIS

EXAMPLE 1

To a one liter, 4-neck flask equipped with a mechanical stirrer, reflux condenser, thermometer, and inlets for the gradual addition of monomers, caustic solution and initiator solution was added 206 grams of deionized water. This contents of the flask were heated to 70° C. A monomer solution of 180 grams of glacial acrylic acid and 20 grams of cis-1,2,3,6-tetrahydrophthalic anhydride, and an initiator solution of 10 grams sodium persulfate in 50 grams of deionized water were added linearly and separately into the flask while stirring over two hours. Once the additions were complete, the system was kept at 70° C. for an additional thirty minutes. The system was then cooled to 60° C.

The resultant polymer solution had a pH of less than 1.0 and a solids content of 46.5%. Based on gel permeation chromatography (GPC), the weight average molecular weight (Mw) was 21,200 and the number average molecular weight (Mn) was 8950. The residual acrylic acid content was 0.06% and the residual cis-1,2,3,6-tetrahydrophthalic anhydride was 1.2%.

EXAMPLE 2

To a two liter, 4-neck flask equipped with a mechanical stirrer, reflux condenser, thermometer, and inlets for the gradual addition of monomers, caustic solution and initiator solution was added 225 grams of deionized water and 3.3 grams of a 0.15% copper (II) sulfate pentahydrate aqueous solution. The contents of the flask were heated to 93° C. A first monomer solution of 187.5 grams of glacial acrylic acid, a second monomer solution of 48.3 grams of cis-1.2.3.6-tetrahydrophthalic anhydride, 50.9 grams of 50% by weight aqueous sodium hydroxide and 97.3 grams deionized water, an initiator solution of 41.6 grams of 30% by weight aqueous hydrogen peroxide and 40 grams of deionized water, and a neutralizer solution of 104.1 grams of 50% by weight aqueous sodium hydroxide were added linearly and separately into the flask while stirring over two hours. Once the additions were complete, the system was kept at 93° C. for an additional thirty minutes. The system was then cooled to 60° C.

The resultant polymer solution had a pH of 4.7 and a solids content of 36.9%. Based on GPC, Mw was 12,900 and Mn was 8010. The residual acrylic acid content was 0.54% and the residual cis-1,2,3,6tetrahydrophthalic anhydride was 0.54%.

EXAMPLE 3

To a two liter, 4-neck flask equipped with a mechanical stirrer, reflux condenser, thermometer, and inlets for the gradual addition of monomer, caustic solution, chain regulator solution and initiator solution was added 300 grams of deionized water and 4.98 grams of a 0.15% aqueous ferrous sulfate heptahydrate solution. The contents of the flask were heated to 70° C. A monomer solution of 225 grams of glacial acrylic acid and 25 grams of cis-1,2.3,6-tetrahydrophthalic anhydride, an initiator solution of 0.95 grams of sodium persulfate in 50 grams of deionized water, and a chain regulator solution of 17.5 grams sodium metabisulfite in 50 grams of deionized water were added linearly and separately into the flask while stirring over two hours. Once the additions were complete, the system was cooled to 60° C. and 6.0 grams of 30% by weight aqueous hydrogen peroxide was added. An exotherm increased the temperature to 65° C. The system was kept at 65° C. for an additional five minutes. The system was then cooled to 60° C.

The resultant polymer solution had a pH of less than 1.0 and a solids content of 39.7%. Based on GPC, Mw was 6020 and Mn was 4850. The residual acrylic acid content was 0.28% and the residual cis-1,2,3,6-tetrahydrophthalic anhydride was 2.8%.

EXAMPLE 4

To a one liter, 4-neck flask equipped with a mechanical stirrer, reflux condenser, thermometer, and inlets for the gradual addition of monomer and initiator solution was added 90.5 grams of deionized water, 126.75 grams of maleic anhydride, 11.2 grams of cis-1,2,3,6-tetrahydrophthalic anhydride, 5.0 grams of a 0.15% aqueous ferrous sulfate heptahydrate solution and 82.0 grams of 50% by weight aqueous sodium hydroxide. The contents of the flask were heated to 95° C. 280.0 grams of monomer solution was prepared by combining 87.5 grams of glacial acrylic acid 87.5 grams of 50% by weight aqueous sodium hydroxide and 105.0 grams of deionized water. An initiator solution of 6.25 grams of sodium persulfate and 66.7 grams of 30% by weight aqueous hydrogen peroxide was prepared. 28.0 grams of the monomer solution was added to the flask. After two minutes, 7.5 grams of the initiator solution was added to the flask. The contents of the flask were then heated to 100° C. The remainder of the monomer solution and initiator solutions were then fed into the flask linearly and separately while stirring over two hours and fifteen minutes and two hours and twenty minutes respectively. Once the additions were complete, the system was kept at 100° C. for 30 minutes. The system was cooled to 80° C. and 27.5 grams of 27.3% by weight aqueous sodium metabisulfite was added. An exotherm increased the temperature to 88° C. The system was then cooled to 60° C.

The resultant polymer solution had a pH of 4.8 and a solids content of 44.7%. Based on GPC, Mw was 3230 and Mn was 2540. The residual acrylic acid content was 61 ppm and the residual maleic acid was 431 ppm.

EXAMPLE 5

The procedure of Example 4 was repeated except 80.0 grams of deionized water, 105.6 grams of maleic anhydride, 22.3 grams of cis-1,2,3,6-tetrahydrophthalic anhydride, 5.0 grams of a 0.15% aqueous ferrous sulfate heptahydrate solution and 73.5 grams of 50% by weight aqueous sodium hydroxide were initially added to the reactor; the monomer solution was a 320 gram solution prepared by combining 100.0 grams of glacial acrylic acid, 100.0 grams of 50% by weight aqueous sodium hydroxide and 120.0 grams of deionized water.

The resultant polymer solution had a pH of 4.6 and a solids content of 45.8%. Based on GPC, Mw was 4770 and Mn was 3060. The residual acrylic acid content was 41ppm and residual maleic acid was 187 ppm.

EXAMPLE 6

The procedure of Example 4 was repeated except 86.0 grams of deionized water, 116.2 grams of maleic anhydride, 22.4 grams of cis-1,2,3,6-tetrahydrophthalic anhydride, 5.0 grams of a 0.15% aqueous ferrous sulfate heptahydrate solution and 80.0 grams of 50% by weight aqueous sodium hydroxide were initially added to the reactor; the initiator cofeed was 6.25 grams of sodium persulfate and 50.0 grams of 30% by weight aqueous hydrogen peroxide of which 6.0 grams were added prior to the beginning of the feeds.

The resultant polymer solution had a pH of 4.8 and a solids content of 47.0%. Based on GPC. Mw was 3380 and Mn was 2540. The residual acrylic acid content was <1 ppm and residual maleic acid was 210 ppm.

EXAMPLE 7

The procedure of Example 5 was repeated except 90.0 grams of deionized water, 167.6 grams of cis-1,2,3,6-tetrahydrophthalic anhydride, 6.0 grams of a 0.15% aqueous ferrous sulfate heptahydrate solution, 1.33 grams of a 0.15% aqueous copper sulfate solution and 105.8 grams of 50% by weight aqueous sodium hydroxide were initially added to the reactor; the monomer solution was 55 grams of acrylic acid; and an additional 3 grams of 50% by weight hydrogen peroxide was initially added to the reactor.

The resultant polymer solution had a pH of 4.6 and a solids content of 54.3%. Based on GPC, Mw was 1900 and Mn was 1750. The residual acrylic acid content was 62 ppm and residual cis-1.2,3.6-tetrahydrophthalic anhydride was 3%.

EXAMPLE 8

To a two liter, 4-neck flask equipped with a mechanical stirrer, reflux condenser, thermometer, and inlets for the gradual addition of monomer, caustic solution and initiator solution was added 155.7 grams of deionized water, 5.26 grams of 0.15% aqueous ferrous sulfate heptahydrate solution, and 52.86 grams of 42.2% by weight solution of the sodium salt of CDC. The contents of the flask were heated to 95° C. A monomer solution of 200 grams of glacial acrylic acid, an initiator solution of 6.0 grams of sodium persulfate dissolved in 40.0 grams deionized water and 13.3 grams 30% by weight hydrogen peroxide, and a neutralizer solution of 110.8 grams 50% by weight sodium hydroxide were added linearly and separately into the flask while stirring over two hours. The system was kept at 95° C. for an additional five minutes then cooled to 60° C.

The resultant polymer solution had a solids content of 45.8%. Based on GPC, Mw was 16600 and Mn was 6570. The residual acrylic acid content was 0.02% and the residual cis-1,2,3,6-tetrahydrophthalic anhydride was 0.9%.

EXAMPLE 9

To a two liter, 4-neck flask equipped with a mechanical stirrer, reflux condenser, thermometer, and inlets for the gradual addition of monomer, caustic solution and initiator solution was added 243.3 grams of deionized water. The contents of the flask were heated to 70° C. A monomer solution of 200 grams of glacial acrylic acid and 52.86 grams of 42.2% by weight solution of the sodium salt of CDC, an initiator solution of 10.0 grams of sodium persulfate dissolved in 40.0 grams deionized water, and a neutralizer solution of 110.8 grams 50% by weight sodium hydroxide were added linearly and separately into the flask while stirring over two hours. The system was kept at 70° C. for an additional five minutes then cooled to 60° C.

The resultant polymer solution had a solids content of 36%. Based on GPC, Mw was 112000 and Mn was 24000. The residual acrylic acid content was <0.01% and the residual CDC was 1.2%.

EXAMPLE 10

The same procedure as Example 9 was followed except that the temperature was 90° C.

The resultant polymer solution had a solids content of 40.8%. Based on GPC. Mw was 284000 and Mn was 9400. The residual acrylic acid content was <0.01% and the residual CDC was 0.98%.

EXAMPLE 11

The same procedure as Example 9 was followed except 258.2 grams deionized water was added to the flask, and the initiator solution was 20.0 grams sodium persulfate in 40.0 grams deionized water.

The resultant polymer solution had a solids content of 38%. Based on GPC, Mw was 76600 and Mn was 15800. The residual acrylic acid content was <0.01% and the residual CDC was 0.81%.

EXAMPLE 12

The same procedure as Example 11 was followed except the temperature was 90° C.

The resultant polymer solution had a solids content of 40.5%. Based on GPC, Mw was 19900 and Mn was 7160. The residual acrylic acid content was <0.01% and the residual CDC was 0.3%.

EXAMPLE 13

To a two liter, 4-neck flask equipped with a mechanical stirrer, reflux condenser, thermometer, and inlets for the gradual addition of monomer, caustic solution, chain regulator solution and initiator solution was added 268.55 grams of deionized water, and 6.7 grams of 0.15% aqueous ferrous sulfate heptahydrate solution. The contents of the flask were heated to 90° C. A monomer solution of 200 grams of glacial acrylic acid and 52.86 grams of 42.2% by weight solution of the sodium salt of CDC, an initiator solution of 6.0 grams of sodium persulfate dissolved in 20.0 grams deionized water, a chain regulator solution of 12.0 grams sodium hypophosphite in 40.0 grams deioinzed water, and a neutralizer solution of 166.4 grams 50% by weight sodium hydroxide were added linearly and separately into the flask while stirring over two hours. The system was kept at 90° C. for an additional five minutes then cooled to 60° C.

The resultant polymer solution had a solids content of 38.5%. Based on GPC, Mw was 3780 and Mn was 2640. The residual acrylic acid content was 0.03% and the residual CDC was 1.4%.

EXAMPLE 14

The same procedure as Example 10 was followed except 241.2 grams deionized water was added to the flask, the monomer solution was 180.0 grams glacial acrylic acid and 106.6 grams 42.2% by weight solution of the sodium salt of CDC, the initiator solution was 18.0 grams sodium persulfate dissolved in 36.0 grams deionized water and no neutralizer solution was added. After the polymer mixture was cooled to 60° C., a neutralizer solution of 100.0 grams 50% by weight sodium hydroxide was added slowly while maintaining the temperature of the mixture below 80° C.

The resultant polymer solution had a solids content of 41.6%. Based on GPC, Mw was 7440 and Mn was 3890. The residual acrylic acid content was <0.001% and the residual CDC was 1.55%.

EXAMPLE 15

The same procedure as Example 14 was followed except 211.2 grams deionized water was added to the flask, the monomer solution was 157.5 grams glacial acrylic acid and 161.1 grams 42.2% by weight solution of the sodium salt of CDC, the initiator solution was 15.75 grams sodium persulfate dissolved in 30.0. After the polymer mixture was cooled to 60° C., a neutralizer solution of 87.2 grams 50% by weight sodium hydroxide was added slowly while maintaining the temperature of the mixture below 80° C.

The resultant polymer solution had a solids content of 41.7%. Based on GPC, Mw was 6600 and Mn was 3520. The residual acrylic acid content was <0.001% and the residual CDC was 4.4%.

EXAMPLE 16

To a two liter, 4-neck flask equipped with a mechanical stirrer, reflux condenser, thermometer, and inlets for the gradual addition of monomer and initiator solution was added 90.0 grams of deionized water, 62.5 grams of maleic acid, 67.07 grams of cis-1,2,3,6-tetrahydrophthalic anhydride, 5.0 grams of a 0.15% aqueous ferrous sulfate heptahydrate solution, 1.3 grams of a 0.15% aqueous coppper sulfate solution and 117.5 grams of 50% by weight aqueous sodium hydroxide. The contents of the flask were heated to 95° C. A monomer feed of 112.5 grams of acrylic acid, and an initiator solution of 7.5 grams of sodium persulfate, 41.6 grams of 30% by weight aqueous hydrogen peroxide and 50.0 grams of deionized water were prepared. 12.5 grams of the monomer feed were added to the flask. After two minutes, 10.0 grams of the initiator solution was added to the flask. The contents of the flask were then heated to 100° C. The remainder of the monomer feed and initiator solution were then fed into the flask linearly and separately while stirring over two hours and fifteen minutes. Once the additions were complete, the system was kept at 100° C. for 30 minutes. The system was then cooled to 60° C.

The resultant polymer solution had a pH of 4.6 and a solids content of 53.6%. Based on GPC, Mw was 3440 and Mn was 2880. There was no detectable residual acrylic acid or 1,2,3,6-cis-tetrahydrophthalic anhydride, and the residual maleic acid was 272 ppm.

EXAMPLE 17

To a one liter, 4-neck flask equipped with a mechanical stirrer, reflux condenser, thermometer, and inlets for the gradual addition of monomer and initiator solution was added 50.0 grams of deionized water, 40.0 grams of maleic acid, 44.7 grams of cis-1,2,3,6-tetrahydrophthalic anhydride, 6.0 grams of a 0.15% aqueous ferrous sulfate heptahydrate solution, 1.3 grams of a 0.15% aqueous coppper sulfate solution and 87.0 grams of 50% by weight aqueous sodium hydroxide. The contents of the flask were heated to 91° C. A monomer solution of 145.0 grams of acrylic acid and 100.0 grams of deionized water, and an initiator solution of 7.5 grams of sodium persulfate, 41.7 grams of 30% by weight aqueous hydrogen peroxide and 50.0 grams of deionized water were prepared. 15.0 grams of glacial acrylic acid were added to the flask. After two minutes, 10.0 grams of the initiator solution were added to the flask. The contents of the flask were then heated to 100° C. The remainder of the monomer solution and initiator solution were then fed into the flask linearly and separately while stirring over two hours and thirty minutes. Once the additions were complete. 1.0 grams of sodium persulfate dissolved in 5.0 grams of deionized water was added. The system was kept at 100° C. for 30 minutes. The system was then cooled to 80° C. A solution of 5.0 grams of sodium metabisulfite dissolved in 20.0 grams of deionized water was added. The system was then cooled to 50° C. and the pH was adjusted from 3.6 to 7.4 with 164.0 grams of 50% by weight aqueous sodium hydroxide.

The resultant polymer solution had a solids content of 45.1%. Based on GPC, Mw was 6290 and Mn was 4070. There was no detectable residual acrylic acid or 1,2,3,6- cis-tetrahydrophthalic anhydride, and the residual maleic acid was 142 ppm.

EXAMPLE 18

The procedure of Example 17 was repeated except that the 65.0 grams of deionized water is initially charged to the flask, 75.0 grams of maleic anhydride, 44.8 grams of cis-1,2,3.6-tetrahydrophthalic anhydride, 112.5 grams of 50% by weight aqueous sodium hydroxide were initially added to the reactor: the monomer solution was 110.0 grams of glacial acrylic acid, 15 grams of glacial acrylic acid were introduced into the flask at 97.0° C. After the system was cooled to 80° C., a solution of 3.0 grams of sodium metabisulfite dissolved in 10.0 grams of deionized water was added. The system was then cooled to 50° C. and the pH was not adjusted.

The resultant polymer solution had a pH of 4.1 and a solids content of 55.0%. Based on GPC, Mw was 4830 and Mn was 3350. There was no detectable residual acrylic acid or 1,2,3,6-cis-tetrahydrophthalic anhydride, and the residual maleic acid was 204 ppm.

EXAMPLE 19

To a half liter, 4-neck flask equipped with a mechanical stirrer, reflux condenser, thermometer, and inlets for the gradual addition of monomer and initiator solution was added 31.9 grams of deionized water, 25.52 grams of maleic acid 28.75 grams of 5-norbornene-2,3-dicarboxylic acid anhydride, 3.83 grams of a 0.15% aqueous ferrous sulfate heptahydrate solution, 0.83 grams of a 0.15% aqueous coppper sulfate solution and 55.51 grams of 50% by weight aqueous sodium hydroxide. The contents of the flask were heated to 95° C. A monomer solution of 92.51 grams of acrylic acid and 63.8 grams of deionized water, and an initiator solution of 4.78 grams of sodium persulfate, 26.60 grams of 30% by weight aqueous hydrogen peroxide and 31.90 grams of deionized water were prepared. 9.57 grams of the glacial acrylic acid were added to the flask. After two minutes. 6.38 grams of the initiator solution were added to the flask. The contents of the flask were then heated to 100° C. The remainder of the monomer feed and initiator solution were then fed into the flask linearly and separately while stirring over two hours and thirty minutes. Once the additions were complete, 1.0 grams of sodium persulfate dissolved in 5.0 grams of deionized water was added. The system was kept at 100° C. for 30 minutes. The system was then cooled to 80° C. A solution of 5.0 grams of sodium metabisulfite dissolved in 20.0 grams of deionized water was added. The system was then cooled to 50° C. and the pH was adjusted from 3.9 to 7.9 with 100.0 grams of 50% by weight aqueous sodium hydroxide.

The resultant polymer solution had a solids content of 44.1%. Based on GPC, Mw was 12500 and Mn was 4970. There were no detectable residual monomers.

EXAMPLE 20

The procedure of Example 17 was repeated except that the 40.0 grams of deionized water is initially charged to the flask, 50.0 grams of maleic anhydride, 22.3 grams of cis-1,2,3,6-tetrahydrophthalic anhydride. 78.6 grams of 50% by weight aqueous sodium hydroxide were initially added to the reactor: the monomer solution was 160.0 grams of glacial acrylic acid and 100.0 grams of deionized water.

The resultant polymer solution had a pH of 3.4 and a solids content of 55.0%. Based on GPC. Mw was 4830 and Mn was 3350. There was no detectable residual acrylic acid or 1,2,3,6-cis-tetrahydrophthalic anhydride, and the residual maleic acid was 204 ppm.

The. pH was adjusted from 3.4 to 7.5 with 175.8 grams of 50% by weight aqueous sodium hydroxide. The resultant polymer solution had a solids content of 45.3%. Based on GPC, Mw was 11600 and Mn was 5060. There was no detectable residual acrylic acid or 1,2,3,6-cis-tetrahydrophthalic anhydride, and the residual maleic acid was 64 ppm.

EXAMPLE 21

To a one liter, 4-neck flask equipped with a mechanical stirrer, reflux condenser, thermometer, and inlets for the gradual addition of monomer and initiator solution was added 90.5 grams of deionized water, 126.75 grams of maleic anhydride, 11.2 grams of cis-1,2,3,6-tetrahydrophthalic anhydride, 5.0 grams of a 0.15% aqueous ferrous sulfate heptahydrate solution and 82.0 grams of 50% by weight aqueous sodium hydroxide. The contents of the flask were heated to 95° C. 280.0 grams of monomer solution was prepared by combining 87.5 grams of glacial acrylic acid, 87.5 grams of 50% by weight aqueous sodium hydroxide and 105.0 grams of deionized water. An initiator solution of 6.25 grams of sodium persulfate and 66.7 grams of 30% by weight aqueous hydrogen peroxide was prepared. 28.0 grams of the monomer solution was added to the flask. After two minutes, 7.5 grams of the initiator solution was added to the flask. The contents of the flask were then heated to 100° C. The remainder of the monomer solution and initiator solutions were then fed into the flask linearly and separately while stirring over two hours and fifteen minutes and two hours and twenty minutes respectively. Once the additions were complete, the system was kept at 100° C. for 30 minutes. The system was cooled to 80° C. and 27.5 grams of 27.3% by weight aqueous sodium metabisulfite was added. An exotherm increased the temperature to 88° C. The system was then cooled to 60° C.

The resultant polymer solution had a pH of 4.8 and a solids content of 44.7% Based on GPC. Mw was 5270. The residual acrylic acid content was 61 ppm and the residual maleic acid was 431 ppm.

The data in Table I, below, are the weight percent of the total monomer of: cyclohexene anhydride, reported as "(a)", monoethylenically unsaturated monomers, reported as "(b)", and optional monoethylenically unsaturated monomer as "(c)". The weight average molecular weight ($M_w$) and number average molecular weight (Mn) were determined by aqueous gel permeation chromatography using a poly(acrylic acid) standard.

TABLE I

| Example | Comp. (a) | Comp. (b) | Comp. (c) | $M_w$ | $M_n$ |
|---|---|---|---|---|---|
| 1 | 10 | 90 | 0 | 21200 | 8950 |
| 2 | 20 | 80 | 0 | 12900 | 8010 |
| 3 | 10 | 90 | 0 | 6020 | 4850 |
| 4 | 5 | 35 | 60 | 3230 | 2540 |
| 5 | 10 | 40 | 50 | 4770 | 3060 |
| 6 | 10 | 35 | 45 | 3380 | 2540 |
| 7 | 75 | 25 | 0 | 1900 | 1750 |
| 8 | 10 | 90 | 0 | 16600 | 6570 |
| 9 | 10 | 90 | 0 | 112000 | 24000 |
| 10 | 10 | 90 | 0 | 284000 | 9400 |
| 11 | 10 | 90 | 0 | 76600 | 15800 |
| 12 | 10 | 90 | 0 | 19900 | 7160 |
| 13 | 10 | 90 | 0 | 3780 | 2640 |
| 14 | 20 | 80 | 0 | 7440 | 3890 |

TABLE I-continued

| Example | Comp. (a) | Comp. (b) | Comp. (c) | $M_w$ | $M_n$ |
|---|---|---|---|---|---|
| 15 | 30 | 70 | 0 | 6600 | 3520 |
| 16 | 30 | 45 | 25 | 3440 | 2880 |
| 17 | 20 | 64 | 16 | 6290 | 4070 |
| 18 | 20 | 50 | 30 | 48 30 | 3350 |
| 19 | 20 | 64 | 16 | 12500 | 4970 |
| 20 | 10 | 70 | 20 | 11600 | 5060 |
| 21 | 20 | 80 | 0 | 5270 | |

WATER-TREATMENT EVALUATION

The polymers of the present invention are useful as water-treatment additives. To evaluate their effectiveness, a polymer sample was analyzed in the following test.

CALCIUM CARBONATE (CaCO3) ANTI-PRECIPITATION TEST

Three stock solutions were prepared as follows:
1. Alkalinity Solution 2.14 grams NaHCO3 and 1.35 grams Na2CO3 were added to a volumetric flask and were diluted to a total volume of 2.00 liters with deionized water.

2. Hardness Solution 3.74 grams of CaCl2.2H2O and 1.53 grams of MgSO4 were added to a volumetric flask and were diluted to a total volume of 2.00 liters. To this solution was added 5 drops of 2N HCl.

3. Polymer or Phosphonate Solutions

A polymer sample (or 2-phosphonobutane-1,2,4-tricarboxylic acid) was diluted to 0.1 percent by weight solids with deionized water and the pH was adjusted to 5.0–6.0 with 1 percent by weight aqueous NaOH.

From the three stock solutions above were prepared:
1. A control solution of 50 milliliters (mls) of alkalinity solution and mls of hardness solution.
2. A 100% inhibited solution of 50 mls of hardness solution and 50 mls of deionized water.
3. A test solution of 50 mls of alkalinity solution. 50 mls of hardness solution and 0.7 mls of polymer solution.

Into separate glass jars were added the control solution, the 100% inhibited solution and the test solution. The jars were placed in a constant temperature water bath set at 54° C. and allowed to stand for 20 hours. The jars were then removed from the water bath and the contents were immediately filtered through a 0.22 micron filter into another clean, dry jar. 40.0 grams of the filtered solution, 0.5 mls of 0.05N HCL and 0.1 grams of Calgon brand certified calcium indicating powder (catalog #R-5293) were added to an Ehrlenmeyer flask and titrated with Calgon brand certified hardness titrating solution 20 (catalog #R-5011) The percent CaCO3 inhibition was calculated as follows where each of the values is the number of milliliters of titrating solution needed to reach the endpoint against the other solutions:

% CaCO3 inhibition = 100 ×

$$\frac{(\text{test solution}) - (\text{control solution})}{(100\% \text{ inhibited solution}) - (\text{control solution})}$$

The CaCO3 inhibition property of the polymer was measured in this manner and the data appear in Table II below as the average of two results.

TABLE II

| Polymer of Example | % CaCO3 Inhibition | Standard Deviation |
|---|---|---|
| 17 | 70.9 | 6.08 |

The data in Table II show that the polymers of the present invention are useful water treatment additives and are effective for inhibiting calcium carbonate formation in an aqueous system.

CAUSTIC SOLUBILITY EVALUATION

The polymers of the present invention are useful in cleaning solutions containing high levels of caustic. Many cleaning solutions such as industrial bottle washing detergents, clean-in-place detergents metal cleaning fluids, industrial and institutional laundry detergents contain high levels of caustic. Polymers are useful in these compositions as dispersants, sequestrants and anti-precipitants; however, many polymers cannot be used in these applications because they are not soluble. The polymers of the present invention show solubility in highly caustic solutions. The solubility in caustic solutions was evaluated in the following manner:

To a 25 mls glass vial was added 50 percent by weight aqueous sodium hydroxide. To the sodium hydroxide was added deionized water and polymer sample to yield a final concentration of 10 percent by weight polymer solids and 5, 10 or 30 percent by weight sodium hydroxide. The solution was stirred and allowed to stand before observations were made. In Table III, below. "insoluble" indicates that either a precipitate formed or phase separation was observed; "part, soluble" indicates that the solution was turbid but that no phase separation was observed; "soluble" indicates that no phase separation was observed and the solution was clear. The compositions reported in Table III, below, are the weight percent of the total monomer of: cyclohexene anhydride, reported as "(a)", monoethylenically unsaturated monomers, reported as "(b)", and optional monoethylenically unsaturated monomer as "(c)".

TABLE III

| Polymer of Example | Composition | | | Caustic Level (percent by weight) | | |
|---|---|---|---|---|---|---|
| | (a) | (b) | (c) | 5 | 10 | 30 |
| 16 | 30 | 45 | 25 | soluble | soluble | soluble |
| 18 | 20 | 50 | 30 | soluble | soluble | soluble |
| 19 | 20 | 64 | 16 | soluble | soluble | soluble |
| Comparatives | | | | | | |
| | | 65 | 35 | insoluble | insoluble | part. soluble |
| | | 70 | 30 | insoluble | soluble | soluble |
| | | 75 | 25 | insoluble | insoluble | insoluble |

The data in Table III show that the polymers of the present invention are soluble at a level of 10 percent by weight in various concentrations of caustic. The comparatives examples were conducted using copolymers of acrylic acid as component (a) and maleic acid as component (b).

ANTI-ENCRUSTATION PERFORMANCE EVALUATION

The polymers of the present invention were evaluated to quantitatively assess the effects on the deposition of inorganic scale on fabric. The effects of deposition were evaluated by comparing data from unwashed, washed cloths to data from cloths washed multiple times and then washed. Cotton cloths and cotton/terry blend cloths were washed ten times in a typical European detergent formulation under typical European conditions (see Table IV).

Typical European Conditions were Simulated by the Following Method:

Kenwood brand Mini-E washing machines were filled with six liters of tap water. Calcium chloride and magnesium chloride were added to the water to yield 300 ppm of hardness and in such amounts as to yield a ratio of calcium ions to magnesium ions of 3:1 calculated as calcium carbonate. The washing machines were loaded with approximately 500 grams of fabric including all-cotton terry fabric, cotton fabric, cotton/polyester blends, and polyester. The detergent was added to the machine and the machine was run for an entire cycle. The loads were run for 10 complete cycles, with addition of detergent before each cycle. Other washing conditions which were used in these experiments are found in Table IV, below. The components of the detergent composition in Table IV are reported as parts by weight ("pbw") unless noted otherwise.

The data appearing in Table V, below, are the ash content of the cotton and cotton/terry cloths after ten cycles under European conditions. Cloth samples were dried overnight at room temperature. The cloths were then weighed and placed in a Thermolyne brand muffle furnace (Model number 30400) for 6–7 hours at 800° C. under air. After cooling to room temperature, the ashes that remained were weighed. The values reported in Table V, below, are the percentages by weight of the original sample cloth which remained as ash after being treated in the furnace (averaged over three cloths per experiment).

TABLE IV

TYPICAL EUROPEAN WASH CONDITIONS

| | |
|---|---|
| APPARATUS | Kenwood Mini-E washing machine |
| TEMPERATURE | 90° C. |
| WATER HARDNESS | 300 ppm |
| AGITATION | High |
| WASH CYCLE | 30 minutes |
| WATER LEVEL | 6 liters |
| DETERGENT DOSAGE | 6.5 grams per liter of water |

Typical European Detergent Composition Used to Evaluate Polymers for Anti-Encrustation

| Detergent Component | pbw |
|---|---|
| sodium carbonate | 12.5 |
| zeolite A | 16.7 |
| stearic acid | 2.5 |
| LAS | 7.8 |
| Tergitol 24-L-60 | 2.5 |
| sodium sulfate | 37.5 |
| sodium silicate | 2.2 |
| sodium perborate | 16.7 |
| silicon defoamer | 1.7 |
| polymer | 4.0% by weight |

TABLE V

ASH CONTENT

| Polymer | Cotton | Standard Deviation | Cotton/Terry | Standard Deviation |
|---|---|---|---|---|
| none | 2.62 | 0.12 | 2.94 | 0.05 |
| 6 | 2.18 | 0.08 | 2.33 | 0.05 |
| 13 | 2.19 | 0.03 | 2.41 | 0.06 |
| 21 | 1.91 | 0.08 | 2.32 | 0.05 |

The data appearing in Table V show that the polymers of the present invention are effective for preventing encrustation onto the fabrics.

AUTOMATIC MACHINE DISHWASHING TESTING

The polymers of the present invention were evaluated as additives for automatic machine dishwashing detergents in the following manner.

Test Method

The dishwashing tests were performed using a modified version of A.S.T.M. method D 3556-85, Standard Test Method for Deposition on Glassware During Mechanical Dishwashing. This test method covers a procedure for measuring performance of household automatic dishwashing detergents in terms of the buildup of spots and film on glassware. Glass tumblers were given three cycles in a dishwasher, in the presence of food soils, and the levels of spotting and filming allowed by the detergents under test were compared visually.

A Kenmore brand dishwashing machine was used to perform the washing tests. The bottom rack of the dishwasher was randomly loaded with 14–18 dinner plates and the top rack was randomly loaded with several beakers and cups. Four new 10 ounce tumblers were placed randomly on the top racks as the test glasses. Soil used in the test was a gram mixture of 80% Parkay brand margarine and 20% Carnation brand non-fat dry milk. The amount of soil used for each test was usually 40 grams for the first wash.

When a test was ready to be started, the desired amount of soil was smeared across the plates on the bottom rack, the detergent for the first cycle was placed in the detergent dispenser cup, and the machine was started. A normal cycle consisted of a wash, a rinse, a second wash, and two more rinses followed by a heat-drying cycle. At the beginning of the second wash, the machine was opened and a second detergent aliquot added. Soil was not added when a second detergent dose was added. Calgonit brand rinse aid (a product of Benckiser AG) was used at the recommended dosage in the rinse immediately following the second wash. The temperature of the supply water was maintained at 130° F. To the water supply was added calcium chloride and magnesium chloride in such amounts as to yield 400 ppm of hardness and a ratio of calcium ions to magnesium ions of 3:1 calculated as calcium carbonate. The machine was then allowed to complete the normal cycle including the drying time. This procedure was followed for a total of five complete cycles for each set of glasses.

When the final drying cycle was completed, the door was opened and the four glasses were removed and evaluated for filming and spotting. The test glasses were evaluated by placing them in a light box equipped with a fluorescent light. The glasses ere anked according to the following scale and the average rating for the four glasses is reported below in Table VI:

| Filming | | Spotting | |
|---|---|---|---|
| 0 | No film | 0 | No spots |
| 1 | Barely perceptible | 1 | Random |
| 2 | Slight | 2 | ¼ of lass |
| 3 | Moderate | 3 | ½ of lass |
| 4 | Heavy | 4 | Complete spotting |

Detergent Compositions Tested (by weight solids)

DETERGENT COMPOSITION

20% sodium carbonate
20% BRITESIL® H2O Polysilicate (SiO2:Na2O 2.0:1)
10% sodium citrate.2H2O
15% sodium perborate.4H2O
0.5% enzyme (esperase)
3% nonionic surfactant
21.5 % sodium sulfate
5% polymer (unless specifically stated otherwise)

TABLE VI

| Polymer | Film Rating | Spot Rating |
|---------|-------------|-------------|
| none    | 2.0         | 0.0         |
| 21      | 0.0         | 0.0         |
| 6       | 0.0         | 0.0         |
| 7       | 0.25        | 0.0         |
| none*   | 1.0         | 1.0         |
| 2*      | 0.0         | 1.0         |

*Experiments were conducted with a ratio of calcium ions to magnesium ions of 2:1 calculated as calcium carbonate and no rinse aid was used.

The data appearing in Table VI show the benefit of the polymers of the present invention in an automatic machine dishwashing detergent.

We claim:

1. An aqueous process for preparing water-soluble polymers comprising: polymerizing a monomer mixture in the presence of water and one or more polymerization initiators at an elevated temperature, wherein the monomer mixture comprises
    (a) from about 3 to about 95 percent by weight of one or more cyclohexene anhydrides or the alkali metal or ammonium salts thereof;
    (b) from about 5 to about 97 percent by weight of one or more monomers selected from the group consisting of
        (i) compounds having the formula

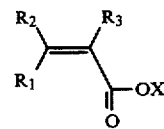

where
    $R_1$ and $R_2$, are each independently selected from the group consisting of hydrogen, methyl, and ethyl;
    $R_3$ is selected from the group consisting of hydrogen, methyl, ethyl, propyl, isopropyl, butyl, isobutyl and tert-butyl; and
    X is selected from the group consisting of hydrogen, methyl, ethyl, propyl, hydroxyethyl, hydroxy propyl, alkali metals, and ammonium, and
    ii) acrylamides, and substituted acrylamides; and optionally
    (c) from 0 to about 90 percent by weight of one or more monoethylenically unsaturated monomers wherein said monoethylenically unsaturated monomers are at least partially water-soluble and polymerizable with (a) and (b).

2. The process of claim 1 wherein component (a) is present in a reactor and components (b) and (c) are fed into the reactor for 5 minutes to 5 hours.

3. The process of claim 1 wherein the elevated temperature is from about 25° C. to about 110° C.

4. The process of claim 1 further comprising feeding a neutralizer solution.

5. The process of claim 4 wherein the neutralizer solution is an aqueous sodium hydroxide solution.

6. The process of claim 1, wherein: the one or more cyclohexene anhydrides are selected from 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2.3-dicarboxylic anhydride, 3-methyl-1,2,6-tetrahydrophthalic anhydride, and 2-methyl-1,3,6-tetrahydrophthalic anhydride.

7. The process of claim 1, wherein: the one or more cyclohexene anhydrides are selected from 1,2,3,6-tetrahydrophthalic anhydride, 5-norbornene-2,3-dicarboxylic anhydride, and 3,6-epoxy-1,2,3,6-tetrahydrophthalic anhydride and the alkali metal and ammonium salts thereof.

8. The process of claim 1 wherein (a) is present at from about 5 to about 90 percent by weight.

9. The process of claim 1 wherein (a) is present at from about 10 to about 85 percent by weight.

* * * * *